(12) United States Patent
Hashimoto

(10) Patent No.: US 7,830,103 B2
(45) Date of Patent: Nov. 9, 2010

(54) METHOD FOR DRIVING ULTRASONIC MOTOR

(75) Inventor: Yasuharu Hashimoto, Minami-Minowa (JP)

(73) Assignee: Seiko Epson Corporation (JP)

( * ) Notice: Subject to any disclaimer, the term of this patent is extended or adjusted under 35 U.S.C. 154(b) by 304 days.

(21) Appl. No.: 12/165,687

(22) Filed: Jul. 1, 2008

(65) Prior Publication Data
US 2009/0009109 A1    Jan. 8, 2009

(30) Foreign Application Priority Data
Jul. 2, 2007 (JP) ............... 2007-174396

(51) Int. Cl.
*H02N 2/14* (2006.01)
(52) U.S. Cl. ............ 318/116; 318/119; 310/316.01; 310/316.02; 310/317
(58) Field of Classification Search ........... 318/116, 318/119, 430, 432; 310/316.01, 317, 316.02
See application file for complete search history.

(56) References Cited

U.S. PATENT DOCUMENTS

| | | | | |
|---|---|---|---|---|
| 4,853,579 | A * | 8/1989 | Kawasaki et al. | 310/116 |
| 5,479,063 | A * | 12/1995 | Suganuma | 310/316.02 |
| 5,508,579 | A * | 4/1996 | Suganuma | 310/316.02 |
| 5,563,478 | A * | 10/1996 | Suganuma | 318/116 |
| 6,163,100 | A * | 12/2000 | Morizaki et al. | 310/317 |
| 6,437,480 | B1 * | 8/2002 | Saya | 310/316.01 |
| 6,809,458 | B2 * | 10/2004 | Matsushita et al. | 310/316.01 |
| 6,965,188 | B2 * | 11/2005 | Kasai | 310/317 |
| 2003/0052287 | A1 * | 3/2003 | Iino et al. | 250/559.29 |
| 2003/0107298 | A1 * | 6/2003 | Matsushita et al. | 310/316.02 |
| 2005/0052095 | A1 * | 3/2005 | Kasai et al. | 310/317 |
| 2007/0247023 | A1 * | 10/2007 | Tanimura | 310/316.01 |

FOREIGN PATENT DOCUMENTS

| | | |
|---|---|---|
| JP | 05-137360 | 6/1993 |
| JP | 09-285150 | 10/1997 |
| JP | 2001-268953 | 9/2001 |
| JP | 2004-166324 | 6/2004 |

* cited by examiner

*Primary Examiner*—Paul Ip
(74) *Attorney, Agent, or Firm*—Harness, Dickey & Pierce, P.L.C.

(57) ABSTRACT

A method for driving an ultrasonic motor having an actuator section includes: a step of starting the ultrasonic motor by applying an AC voltage with a first frequency to the actuator section; a voltage detection step of detecting a voltage generated at the actuator section while lowering a driving frequency from the first frequency to a second frequency at which the ultrasonic motor stops; a starting step of starting the ultrasonic motor with a third frequency; and a driving step of changing the driving frequency from the third frequency to a lower frequency such that the driving frequency has a value within an operation frequency range, wherein the operation frequency range is within a range on a higher frequency side than the driving frequency at which a maximum voltage is detected in the voltage detection step.

8 Claims, 12 Drawing Sheets

METHOD FOR DRIVING ULTRASONIC MOTOR

The entire disclosure of Japanese Patent Application No. 2007-174396, filed Jul. 2, 2007 is expressly incorporated by reference herein.

BACKGROUND

1. Technical Field

The present invention relates to a method for driving an ultrasonic motor.

2. Related Art

Ultrasonic motors are one type of the devices that convert electric energy to mechanical energy. One example of such ultrasonic motors may be formed from a rotor with an operation shaft and a piezoelectric actuator in which a tip of the piezoelectric actuator is pressed against a side surface of the rotor. According to this type of ultrasonic motor, the tip of the piezoelectric actuator is vibrated in an elliptical motion in a plane perpendicular to the axis of the rotor, whereby the side surface of the rotor is pushed by the tip of the piezoelectric actuator thereby generating a moment in the rotor, and thus generating a rotational movement of the rotor with its axis as a rotation center. This type of ultrasonic motor is described, for example, in JP-A-2004-166324.

Generally, in ultrasonic motors, the closer the frequency of vibration of the piezoelectric actuator to the resonance frequency of the piezoelectric actuator, the faster the rotation speed of the motor becomes. In this respect, various contrivances have been made in the configuration and arrangement of components in the motor, the manner of vibration of the tip of the piezoelectric actuator, etc.

However, at vibrations near the resonance frequency of the piezoelectric actuator, the piezoelectric actuator may not start vibrating unless the piezoelectric actuator is vibrated at a predetermined frequency or higher, or may start but unexpectedly stop when its vibration lowers below the resonance frequency even slightly due to various reasons, for example, because the tip of the piezoelectric actuator is pressed against the rotor. Also, the resonance frequency is influenced by the surrounding conditions, changes in the temperature of the motor, and the like. Because of the phenomenon described above, stable driving of an ultrasonic motor presents one of the objects to be overcome.

SUMMARY

In accordance with an advantage of some aspects of the invention, a stable and efficient method for driving an ultrasonic motor can be provided.

In accordance with an embodiment of the invention, a method for driving an ultrasonic motor having an actuator section includes: a step of starting the ultrasonic motor by applying an AC voltage with a first frequency to the actuator section; a voltage detection step of detecting a voltage generated at the actuator section while lowering a driving frequency from the first frequency to a second frequency at which the ultrasonic motor stops; a starting step of starting the ultrasonic motor with a third frequency; and a driving step of changing the driving frequency from the third frequency to a lower frequency such that the driving frequency has a value within an operation frequency range, wherein the operation frequency range is a range on a higher frequency side than the driving frequency at which a maximum voltage is detected in the voltage detection step. Consequently, the ultrasonic motor can be stably and efficiently driven.

In the method for driving an ultrasonic motor in accordance with an aspect of the embodiment, the operation frequency range may be within a non-startable range where the ultrasonic motor cannot be started.

In the method for driving an ultrasonic motor in accordance with an aspect of the embodiment, the driving frequency may be changed in the driving step such that the voltage detected at the actuator section becomes lower than a threshold voltage that is obtained by multiplying the maximum voltage by a coefficient.

In the method for driving an ultrasonic motor in accordance with an aspect of the embodiment, in the driving step, the driving frequency may be changed to a higher frequency side when the voltage detected on the actuator section is greater than the threshold voltage, and the driving frequency may be changed to a lower frequency side when the voltage detected on the actuator section is smaller than the threshold voltage.

In the method for driving an ultrasonic motor in accordance with an aspect of the embodiment, the driving step may include changing the driving frequency such that a threshold voltage obtained by multiplying a maximum value of the voltage detected on the actuator section by a coefficient becomes greater than the voltage detected in the voltage detection step.

In the method for driving an ultrasonic motor in accordance with an aspect of the embodiment, the coefficient may be between 0.5 and 0.95.

In the method for driving an ultrasonic motor in accordance with an aspect of the embodiment, in the driving step, the driving frequency may be changed stepwise, and the driving frequency may be changed at an interval between 100 Hz and 1000 Hz.

The method for driving an ultrasonic motor in accordance with an aspect of the embodiment may include a starting frequency detection step of increasing the driving frequency from a state in which the ultrasonic motor is stopped to a state in which the ultrasonic motor starts.

DESCRIPTION OF EXEMPLARY EMBODIMENTS

Preferred embodiments of the invention are described below with reference to the accompanying drawings. It should be noted that the following embodiments are described as examples of the invention.

1. Structure of Ultrasonic Motor 400

First, an example of the structure of an ultrasonic motor in accordance with an embodiment of the invention is described with reference to the accompanying drawings. An example in which an ultrasonic motor 400 includes a rotor section 100 and an actuator section 200 shall be described below. However, the driving method for driving an ultrasonic motor in accordance with the invention is not limited to a method for driving the ultrasonic motor having the structure described above. Ultrasonic motors to which the driving method in accordance with the present embodiment is applicable include, for example, an ultrasonic motor having a plurality of actuator elements arranged in a circular shape, in addition to the embodiment exemplified herein.

Figure 1:
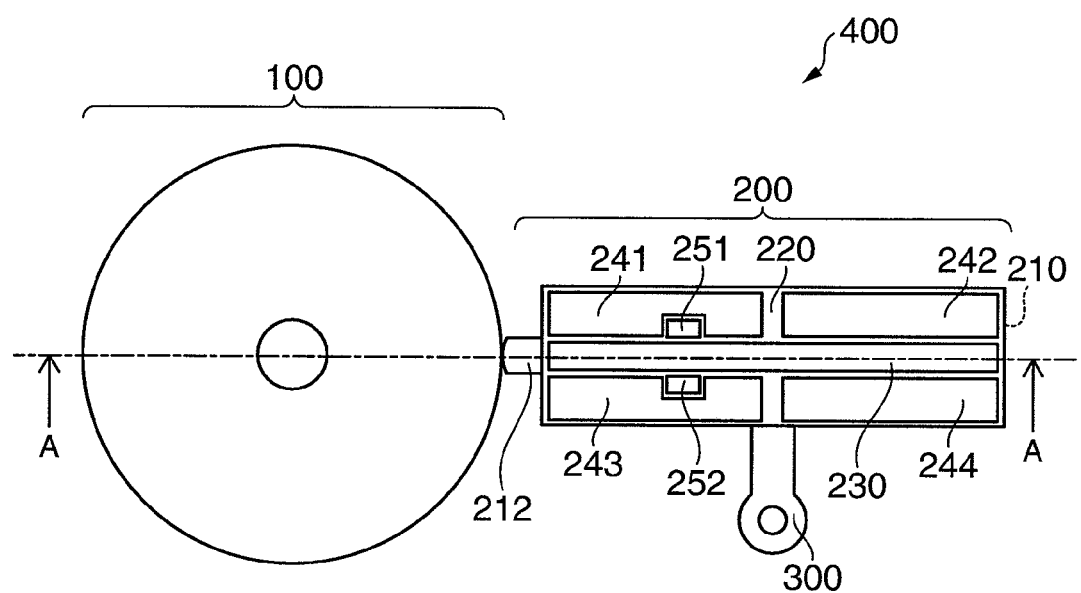
FIG. 1 is a schematic plan view of an ultrasonic motor 400 in accordance with an embodiment of the invention.
Figure 2:
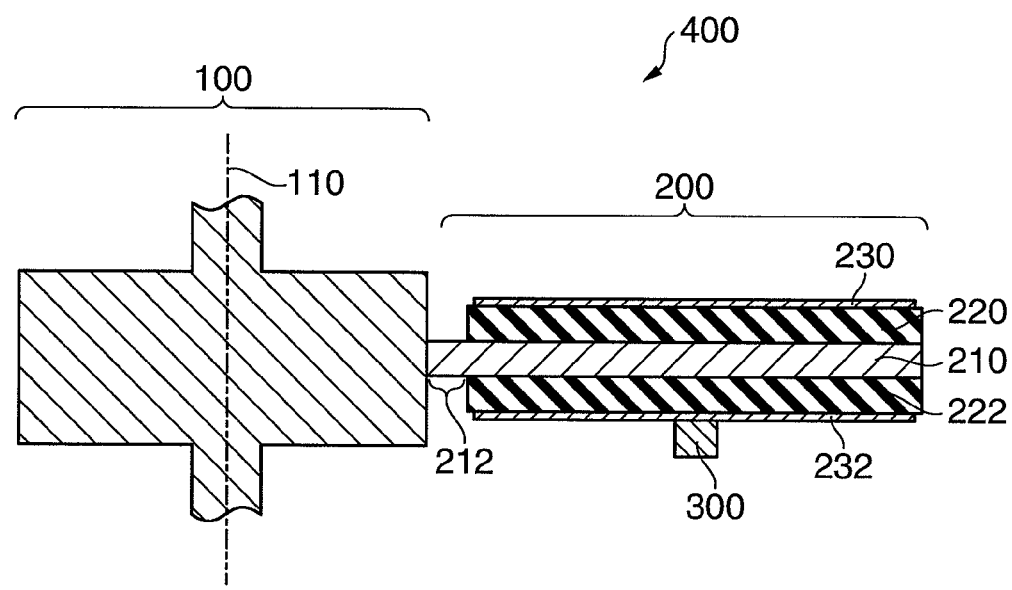
FIG. 2 is a schematic cross-sectional view of the ultrasonic motor 400 in accordance with the present embodiment.

FIG. 1 is a schematic plan view of the ultrasonic motor 400 in accordance with the present embodiment. FIG. 2 is a schematic cross-sectional view of the ultrasonic motor 400 in accordance with the present embodiment. FIG. 2 is a cross-sectional view taken along a line A-A of FIG. 1.

The ultrasonic motor 400 includes a rotor section 100, an actuator section 200 and an actuator support section 300.

The rotor section 100 has an outer peripheral surface that is provided in contact with the actuator section 200. The rotor section 100 is provided in a manner freely rotatable around a rotation center axis 110 as its center. The rotor section 100 is given a moment about the center axis as its outer peripheral surface is kicked by the tip of the actuator section that vibrates, thereby being rotationally driven. The rotor section 100 may be in a cylindrical shape, or may be a cartwheel shape having a shaft with a greater diameter as illustrated in the example. Details about the vibration of the actuator section 200 are described below. Revolutions of the rotor section 100 provide mechanical outputs of the ultrasonic motor. The rotor section 100 may be provided with an encoder as a rotation detection device. The rotor section 100 may preferably be composed of a material that is difficult to be worn out.

The actuator section 200 is formed from, for example, a vibration plate 210, two piezoelectric layers, two electrodes for longitudinal vibration, eight electrodes for flexural vibration, and four electrodes for detection. The actuator section 200 may have a structure symmetrical through a center surface of the vibration plate 210 as a mirror surface in a vertical direction as in the figure. Therefore, in the following description, the structure in its upper side above the vibration plate 210 is described in detail, and detailed description of the structure in its lower side below the vibration plate 210 is omitted.

The vibration plate 210 is a generally rectangular plate-like member. In FIG. 1 and FIG. 2, the vibration plate 210 is illustrated to have a lengthwise direction extending in a right-to-left direction. The vibration plate 210 has a protrusion 212. The protrusion 212 may be formed in one piece with the vibration plate 210, or may be provided on the vibration plate 210 as an independent member. The thickness of the vibration plate 210 may be, for example, 0.1 μm to 200 μm. The vibration plate 210 is provided in a manner to abut against the outer peripheral surface of the rotor section 100 through the protrusion 212. The vibration plate 210 is capable of extension, contraction and flexural movements due to extension and contraction of the upper and lower piezoelectric layers, in a manner that the protrusion 212 can vibrate in an elliptical path adjacent to its tip portion. The vibrations push and move the outer peripheral surface of the rotor section 100 that is in contact with the protrusion 212, such that a rotational movement occurs about the axis of the rotor section 100. The vibration plate 210 may be composed of a conductive material so as to be able to supply electrical power to the piezoelectric layers formed above and below the vibration plate 210. Also, the vibration plate 210 may be composed of a material without conductivity. In this case, electrodes for supplying electrical power to the piezoelectric layers may be independently provided above and below the vibration plate 210. As the material for the vibration plate 210, for example, stainless steel may preferably be used. Also, the vibration plate 210 and the protrusion 212 may be composed of the same material, or mutually different materials. The protrusion 212 may preferably be composed of a material that is difficult to be worn out.

The piezoelectric layer 220 is provided on the vibration plate 210. The piezoelectric layer 220 is capable of extending and contracting upon application of a voltage. The direction of extension and contraction of the piezoelectric layer 220 can be appropriately designed according to the polarity of the voltage to be applied, and the polarization direction of the piezoelectric layer 220. The thickness of the piezoelectric layer 220 may be, for example, 0.1 μm to 200 μm. In the example shown in FIG. 1 and FIG. 2, four electrodes for flexural vibration 241-244 are arranged, such that the piezoelectric layer 220 is in a single layer and polarized in one direction. In this example, depending on the polarity of the voltage applied to each of the electrodes, extension or contraction occurs in the piezoelectric layer in each portion thereof corresponding to each of the electrodes. On the other hand, when extension and contraction occur in the piezoelectric layer 220, voltage can be generated between the vibration plate 210 and the detection electrodes 251 and 252, whereby the operation of the vibration plate 210 can be detected based on the voltage (detected voltage). The piezoelectric layer 220 may be formed from a piezoelectric material, such as, for example, lead zirconate titanate (Pb (Zr, Ti) $O_3$), lead zirconate titanate niobate (Pb (Zr, Ti, Nb) $O_3$) or the like.

The electrode for longitudinal vibration 230 is provided on the piezoelectric layer 220. The electrode for longitudinal vibration 230 is provided to supply electrical power to extend and contract the vibration plate 210, in other words, the actuator section 200 in its lengthwise direction.

The electrodes for flexural vibration 241-244 are provided on the piezoelectric layer 220. The electrodes for flexural vibration 241-244 are electrically insulated from the electrode for longitudinal vibration 230. The electrodes for flexural vibration 241-244 are provided to supply electrical power for flexurally vibrating the vibration plate 210, in other words, the actuator section 200 in a direction perpendicular to the lengthwise direction. Such vibrations can be generated by applying voltages in mutually opposite polarities to the electrode for flexural vibration 241 and the electrode for flexural vibration 242, for example, as illustrated in the figure. As a result, when a portion of the piezoelectric below one of the electrodes extends in the lengthwise direction of the actuator section 200, a portion of the piezoelectric below the other electrode contracts, thereby enabling an operation in which the actuator section 200 flexes with the contracting side as an inner side. By alternately applying such combinations of voltages, the actuator section 200 can have flexural vibrations in the direction perpendicular to its lengthwise direction. In the illustrated example, four electrodes for flexural vibration 241-244 are arranged. However, the number, arrangement and shape of the electrodes can be optionally designed as long as the above-described functions can be achieved. Also, in this example, flex, extension and contraction are generated by using the arrangement of the electrodes. In addition, as another feasible method, flex, extension and contraction may be generated by using the arrangement of polarization of the piezoelectric layer 220.

The electrodes for detection 251 and 252 are provided on the piezoelectric layer 220. The electrodes for detection 251 and 252 are electrically insulated from the electrode for longitudinal vibration 230 and the electrodes for flexural vibration 241-244. The electrodes for detection 251 and 252 are provided for detecting the state of vibration of the vibration plate 210, i.e., the actuator section 200. The detection of vibration is possible by, for example, detecting voltages generated in the piezoelectric below the electrode for detection 251 and the electrode for detection 252, respectively. The voltages reflect displacements in the actuator section 200, and can be used as the amounts indicating the displacements in the actuator section 200. In the illustrated example, two electrodes for detection 251 and 252 are arranged. However, the number, arrangement and shape of the electrodes can be optionally designed as long as the above-described functions can be achieved.

The electrode for longitudinal vibration 230, the electrodes for flexural vibration 241-244 and the electrodes for detection 251 and 252 may be each comprised of metal material, such as, platinum, or conductive oxide, such as, compound oxide of lanthanum and nickel ($LaNiO_3$), in a single layer or a multilayer structure. Each of the electrodes may have a thickness with which a sufficiently low electrical resistance value can be obtained, and may be, for example, 10 nm to 5 μm.

An actuator support section 300 is provided to support the actuator section 200 and retain the actuator section 200 in a manner to be pressed against the rotor section 100. The actuator support section 300 may be formed, for example, in one piece with the vibration plate 210 of the actuator section 200. Also, the actuator support section 300 may be provided in a manner to support the actuator section from below, as in the example shown in FIG. 2. It is noted that, in this example, the group of electrodes below the actuator section 200 is electrically insulated from the actuator support section 300. As the material for the actuator support section 300, for example, stainless steel may preferably be used. Also, the actuator support section 300 and the vibration plate 210 may be formed from the same material, or mutually different materials.

2. Operation of Ultrasonic Motor 400

Figure 3:
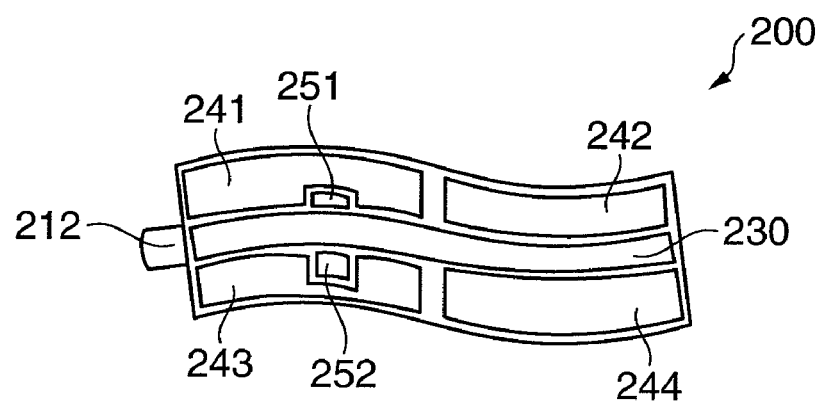
FIG. 3 is a plan view schematically showing an operation of an actuator section of the ultrasonic motor.
Figure 4:
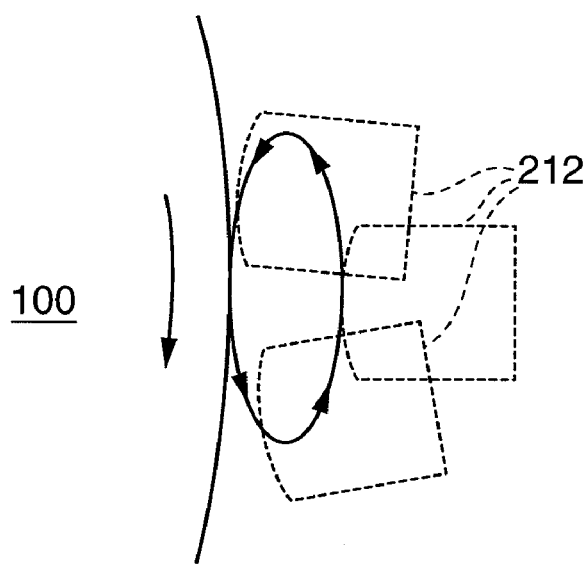
FIG. 4 is a schematic diagram for describing the operation mechanism of an ultrasonic motor.

FIG. 3 is a plan view schematically showing a configuration of the actuator section 200 which the actuator section 200 can momentarily assume in its flexural vibration. FIG. 4 is a schematic depicting the state in which the rotor section 100 is being rotated as it is impinged and moved by the protrusion 212.

As shown in FIG. 3, the actuator section 200 can flex, and extend and contract according to the polarities of voltages applied through the respective electrodes. The flexed state shown FIG. 3 is exaggerated for the purpose of description. In the illustration, the polarities of voltages applied to the electrode for flexural vibration 241 and the electrode for flexural vibration 244, and to the electrode for flexural vibration 242 and the electrode for flexural vibration 243 are opposite to each other. More specifically, a voltage that extends the piezoelectric layer 220 is applied to the electrode for flexural vibration 241 and the electrode for flexural vibration 244, and a voltage that contracts the piezoelectric layer 220 is applied to the electrode for flexural vibration 242 and the electrode for flexural vibration 243. Therefore, the actuator section 200 has an undulating configuration in an instant, as shown in FIG. 3. As the polarities of voltages to be applied to the electrodes are alternated at a specific frequency, the undulating state assumes a configuration reversed with respect to the above in another instant. As a result, the actuator section 200 flexurally vibrates at a cycle of the alternating voltages. At the same time, an AC voltage can also be applied to the electrode for longitudinal vibration 230, such that flexural vibration and extending and contracting vibration (longitudinal vibration) can be simultaneously generated in the actuator section 200. By the combination of such vibrations, the protrusion 212 can be moved in an elliptical locus. Further, the elliptical vibration can have a desired mode by selecting the frequency, the voltage and the phase of the alternate current to be applied.

The movements of the actuator section 200 cause the protrusion 212 to move. As shown by broken lines in FIG. 4, the protrusion 212 can vibrate in a manner that its tip portion draws an elliptical locus with the movements of the actuator section 200 (the vibration plate 210). Then, by the vibration, the side surface of the rotor section 100 is pushed and moved in a direction indicated by an arrow in FIG. 4, and thus the rotor section 100 rotates about the rotation axis 110. The rotational direction and rotational speed of the rotor section 100 can be adjusted by changing the frequency, voltage and phase of the AC voltage to be inputted in the actuator section 200, as described above. It is noted that only the electrodes on the upper side above the vibration plate 210 are described above. However, the members having generally the same functions are also provided on the lower side, which can be appropriately worked cooperatively to perform the operation described above.

3. Control Structure for Ultrasonic Motor 400

Figure 5:
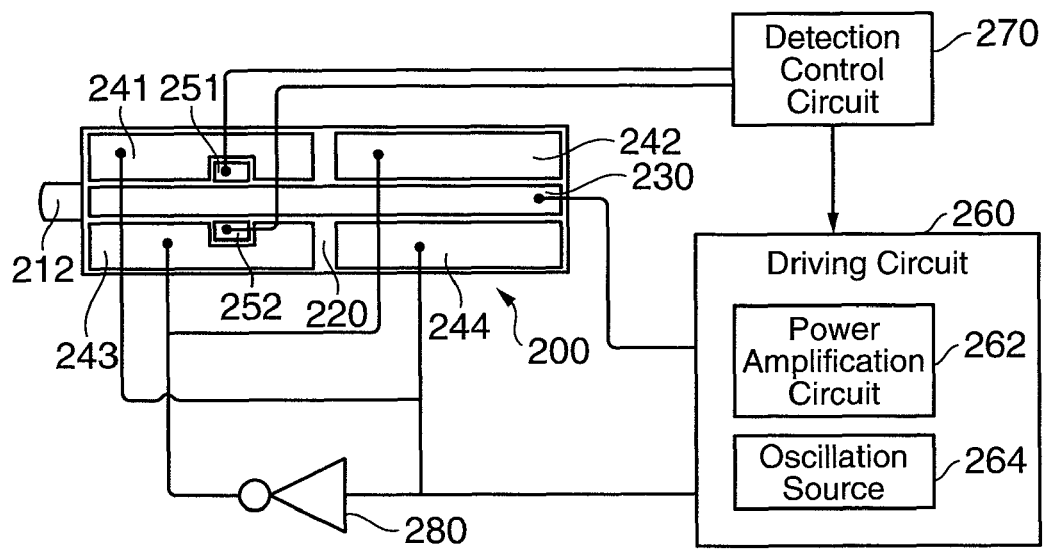
FIG. 5 is a schematic diagram of an example of the circuit structure of an ultrasonic motor in accordance with a present embodiment of the invention.

FIG. 5 is a diagram of a control structure of the ultrasonic motor 400 in accordance with the present embodiment.

Each of the electrodes of the actuator section 200 is electrically connected to a driving circuit 260 and a detection control circuit 270, as exemplified in FIG. 5. In the example shown in FIG. 5, the driving circuit 260 drives the actuator section 200, and the detection control circuit 270 detects the driving of the actuator section 200, and feeds back detected signals to the driving circuit 260. Although not shown, the driving structure in accordance with the present embodiment may be equipped with a storage device that stores the frequency and voltage. Such a structure is described in detail below.

The electrodes for flexural vibration 241-244 and the electrode for longitudinal vibration 230 of the actuator section 200 are connected to the driving circuit 260. The driving circuit 260 vibrates the actuator section 200. The driving circuit 260 can be structured with such circuits as a power amplification circuit 262, an oscillation source 264 and the like. The driving circuit 260 may have a structure for individually driving each of the electrodes, or divided structures for driving the electrodes for flexural vibration 241-244 and the electrode for longitudinal vibration 230, as shown in the figure. The illustrated example includes an inverter 280 for controlling the phases of voltages to be applied to the electrodes for flexural vibration 241 and 244, and the electrodes for flexural vibration 242 and 243.

The detection control circuit 270 is connected to the electrodes for detection 251 and 252. The detection control circuit 270 detects displacements and operation of the actuator section 200 based on voltages generated on the electrodes for detection 251 and 252. The detection control circuit 270 sends out signals according to the detected state of the actuator section 200 to the driving circuit 260. The driving circuit 260 is structured to control vibration operation of the actuator section 200 based on the signals sent from the detection control circuit 270.

4. Driving Characteristics of Ultrasonic Motor 400

Figure 6:
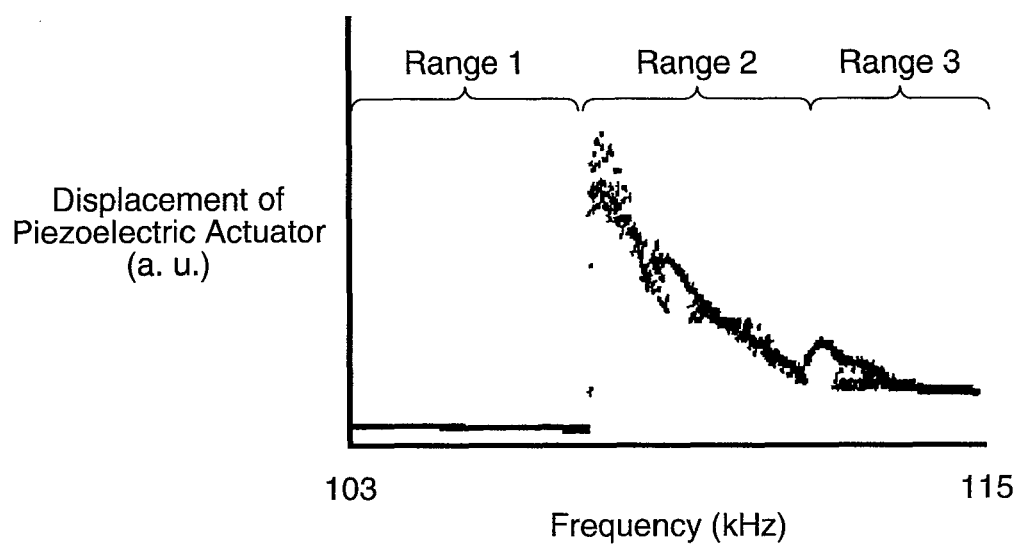
FIG. 6 is a graph for describing operation characteristics of the ultrasonic motor in accordance with the present embodiment.

FIG. 6 shows an example of results obtained on driving the ultrasonic motor 400 in accordance with the present embodiment. Driving characteristics of the ultrasonic motor are described below with reference to FIG. 6.

Along the axis of ordinates in FIG. 6, normalized values of voltages generated at the electrodes for detection are plotted. Along the axis of abscissas, frequencies of input AC voltages are plotted. The data shown in FIG. 6 were obtained in an operation in which the ultrasonic motor 400 was started with a driving frequency of 115 kHz, and the frequency was gradually lowered at step frequencies of 100 Hz.

Displacements of the actuator section 200 plotted along the axis of ordinates in FIG. 6 correspond to measurement results of the voltages generated on the electrodes for detection 251 and 252. The values plotted along the axis of ordinates in FIG. 6 have a relation with the rotational speeds of the ultrasonic motor 400, as described above. In other words, the greater the displacement of the actuator section 200 observed, the greater the rotational speed of the ultrasonic motor 400. The values along the axis of abscissas in FIG. 6 express driving frequencies. In the figure, regions with different practical significances are indicated as Range 1, Range 2 and Range 3.

It is known that the ultrasonic motor 400 in its stopped state does not start upon application of an AC voltage, unless the AC voltage is greater than a specific frequency. The range of frequencies at which an ultrasonic motor can start (i.e., startable frequency range) differs from one ultrasonic motor 400 to another, and is affected by the surrounding temperature and the like. Referring to FIG. 6, when an AC voltage at a frequency in Range 3 is applied to the actuator section 200, displacements occur in the actuator section 200, whereby the ultrasonic motor starts. The reason why the ultrasonic motor 400 starts only in Range 3 is assumed that the actuator section 200 is pushed against the rotor section 100. Accordingly, the ultrasonic motor 400 does not start upon application of an AC voltage with a frequency in Range 1 or Range 2 to the actuator section in its stopped state. In the following description, Range 1 and Range 2 are also referred to as non-startable ranges where the ultrasonic motor 400 cannot be started.

In the region in Range 2 in FIG. 6, the ultrasonic motor 400 cannot be started. However, it is clear from the experiment results in FIG. 6 that the displacement of the actuator section 200 gradually becomes greater as the frequency is gradually changed from Range 3 to frequencies in Range 2. The frequency may be changed in different modes. For example, the frequency may be continuously changed, or changed stepwise. If the frequency is changed stepwise, the interval of changes should not be too large. If the interval of changes is too large, there is a possibility that the rotation of the ultrasonic motor 400 may stop. The ultrasonic motor 400 cannot be started with frequencies in Range 2, but can be operated at higher rotational speeds than the operation conducted with frequencies in Range 3.

On the other hand, in Range 2, as the frequency is lowered and approaches to the boundary with Range 1, the displacement of the actuator section 200 rapidly reduces after having reached its maximum value. In other words, the driving of the ultrasonic motor 400 with frequencies in Range 2 can be performed at higher rotational speeds and more efficiently, compared to the driving with frequencies in Range 3. On the other hand, it involves instability in which the ultrasonic motor 400 may abruptly stop when the frequency lowers from Range 2 toward Range 1. If the ultrasonic motor 400 stops while being driven with a frequency in Range 2, the ultrasonic motor 400 cannot be started with that frequency. Therefore, in order to re-start the ultrasonic motor 400, a frequency in Range 3 needs to be applied.

The ultrasonic motor 400 does not start rotating with frequencies in Range 1 in FIG. 6 even when the driving frequency is gradually lowered from a higher frequency to a frequency in Range 1. Also, the ultrasonic motor 400 in its stopped state does not start even when an AC voltage with a frequency in Range 1 is applied to the ultrasonic motor 400.

5. Method for Driving Ultrasonic Motor 400

Figure 7:
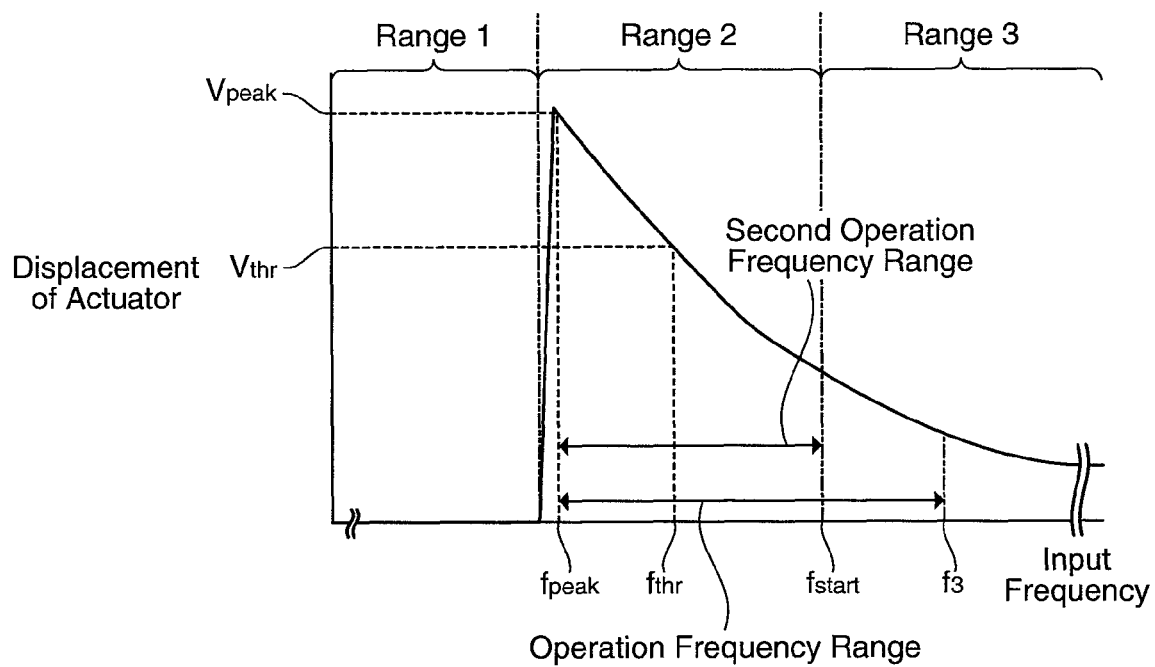
FIG. 7 is a graph showing an example of experimental results of the operation characteristics of the ultrasonic motor in accordance with the present embodiment.

FIG. 7 is a graph schematically showing driving characteristics of the ultrasonic motor 400. FIGS. 8 through 15 are flowcharts of processes in a driving method for driving the ultrasonic motor 400 in accordance with the present embodiment. The driving method in accordance with the present embodiment is described below in detail with reference to FIGS. 7 to 15. It is noted that a "driving frequency" in the following description is a frequency that is set at the oscillation source 264 of the driving circuit 260 in FIG. 5, and the actuator section 200 is driven with this frequency. On the other hand, first-fourth frequencies and a starting frequency are frequency values retained in the detection control circuit 270, and only when these values are set at the oscillation source 264, the actuator section 200 is driven with the aforementioned frequency.

Figure 8A:
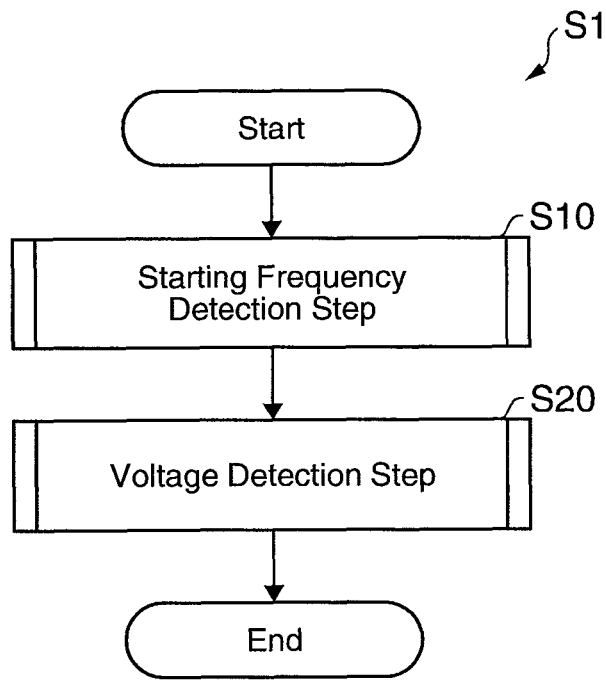
FIGS. 8A and 8B are flow charts of an example of a method for driving the ultrasonic motor in accordance with the embodiment of the invention.
Figure 8B:
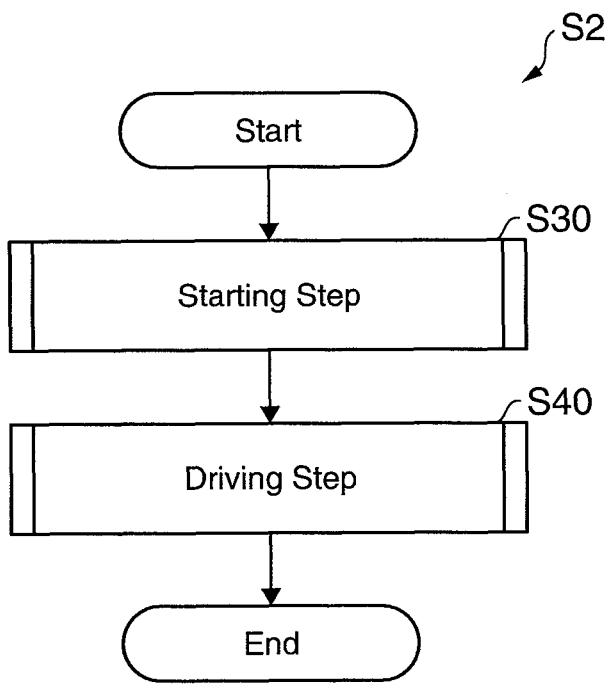

The driving method for driving the ultrasonic motor 400 in accordance with the present embodiment includes a detection step (S1) and an operation step (S2). The detection step includes, as shown in FIG. 8A, a starting frequency detection step (S10) of detecting a starting frequency of the ultrasonic motor 400 and a voltage detection step (S20). The operation step includes, as shown in FIG. 8B, a starting step of starting the ultrasonic motor 400 (S30) and a driving step (S40).

The driving method for driving the ultrasonic motor 400 in accordance with the present invention is executed from the state in which the motor is not driven.

Figure 9:
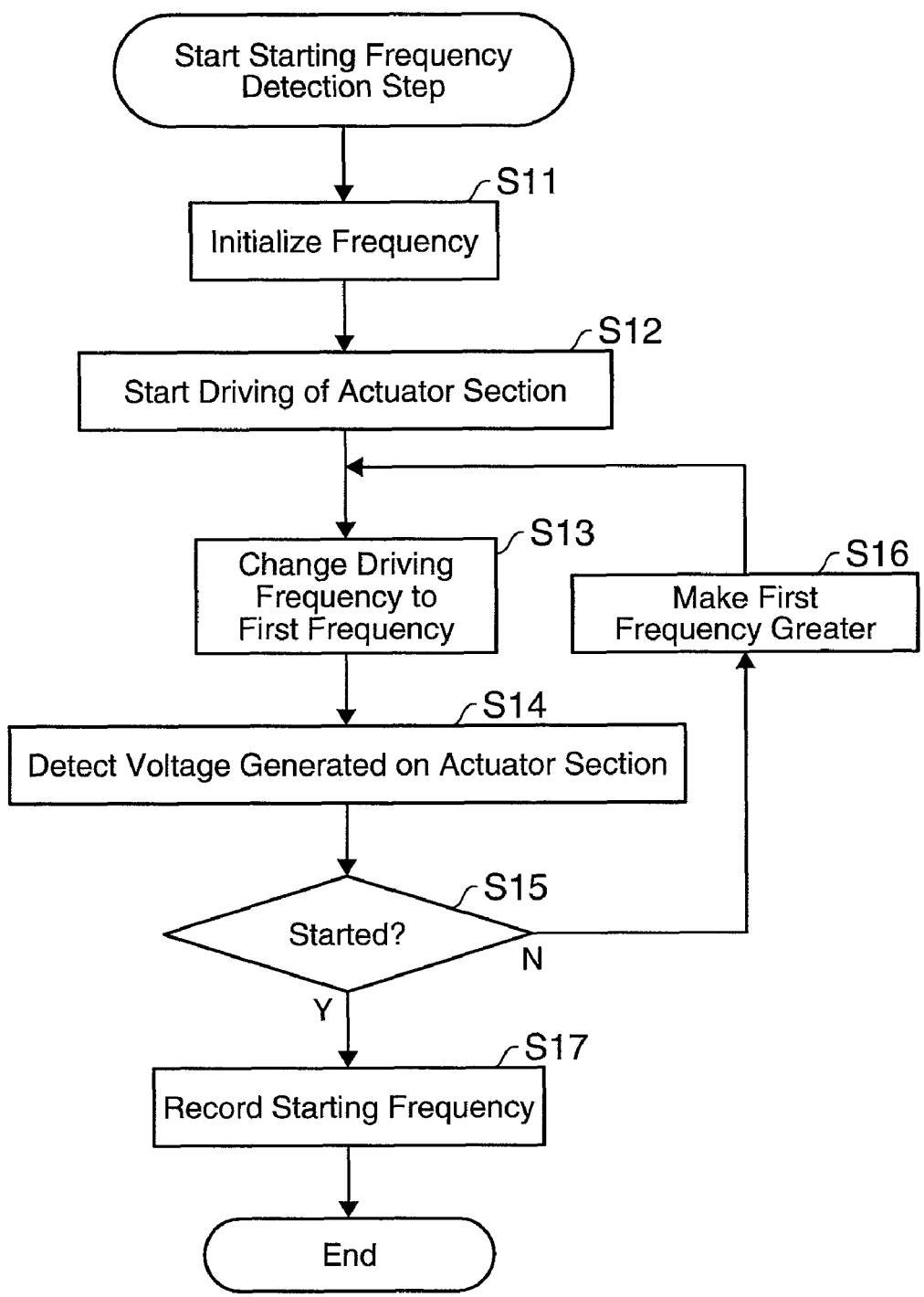
FIG. 9 is a flow chart of an example of the method for driving the ultrasonic motor in accordance with the embodiment of the invention.

In the starting frequency detection step (S10) of the detection step S1, the driving frequency for the actuator section 200 and the first frequency are initialized (step S11), as shown in FIG. 9. The respective frequencies are set by appropriately selecting values that belong to the frequency region in Range 1 in FIG. 6. Driving of the actuator section 200 is started (step S12), and the driving frequency is set to the first frequency (step S13). Voltages are detected from the electrodes for detection 251 and 252 of the actuator section 200 (step S14)

to judge if the ultrasonic motor 400 has started (step S15). Confirmation of the startup may be performed by a rotation detection device such as an encoder or the like (not shown) provided at the rotor section 100. At this moment, if the ultrasonic motor 400 is not starting (N in step S15), the first frequency is made greater (step S16), and the driving frequency is set again to a first frequency (step S13). Then, if the ultrasonic motor 400 is starting (Y in step S15), the first frequency at this moment is recorded as the starting frequency (step S17), and the starting frequency detection step (S10) of detecting the starting frequency of the ultrasonic motor 400 is finished. In the starting frequency detection step (S10), if the driving frequency with which the ultrasonic motor 400 can be started is known in advance, in other words, if the initial value of the first frequency can be set to a frequency in Range 3 in FIG. 7, the judgment as to whether the ultrasonic motor 400 is started (step S15) and the step of increasing the first frequency (step S16) can be omitted. By the steps shown in FIG. 9, the non-startable range can be obtained by increasing the driving frequency from the state in which the ultrasonic motor 400 is stopped until the state in which the ultrasonic motor 400 starts. By providing these steps, even when a frequency $f_{start}$ at the boundary between Range 2 and Range 3 in FIG. 7 is not known, the startable range can be obtained, whereby the ultrasonic motor 400 can be readily started. Also, the steps described above are steps for obtaining a non-startable range. It is noted that, in this example, the ultrasonic motor 400 can be started with the frequency $f_{start}$ at the boundary between Range 2 and Range 3.

Figure 10:
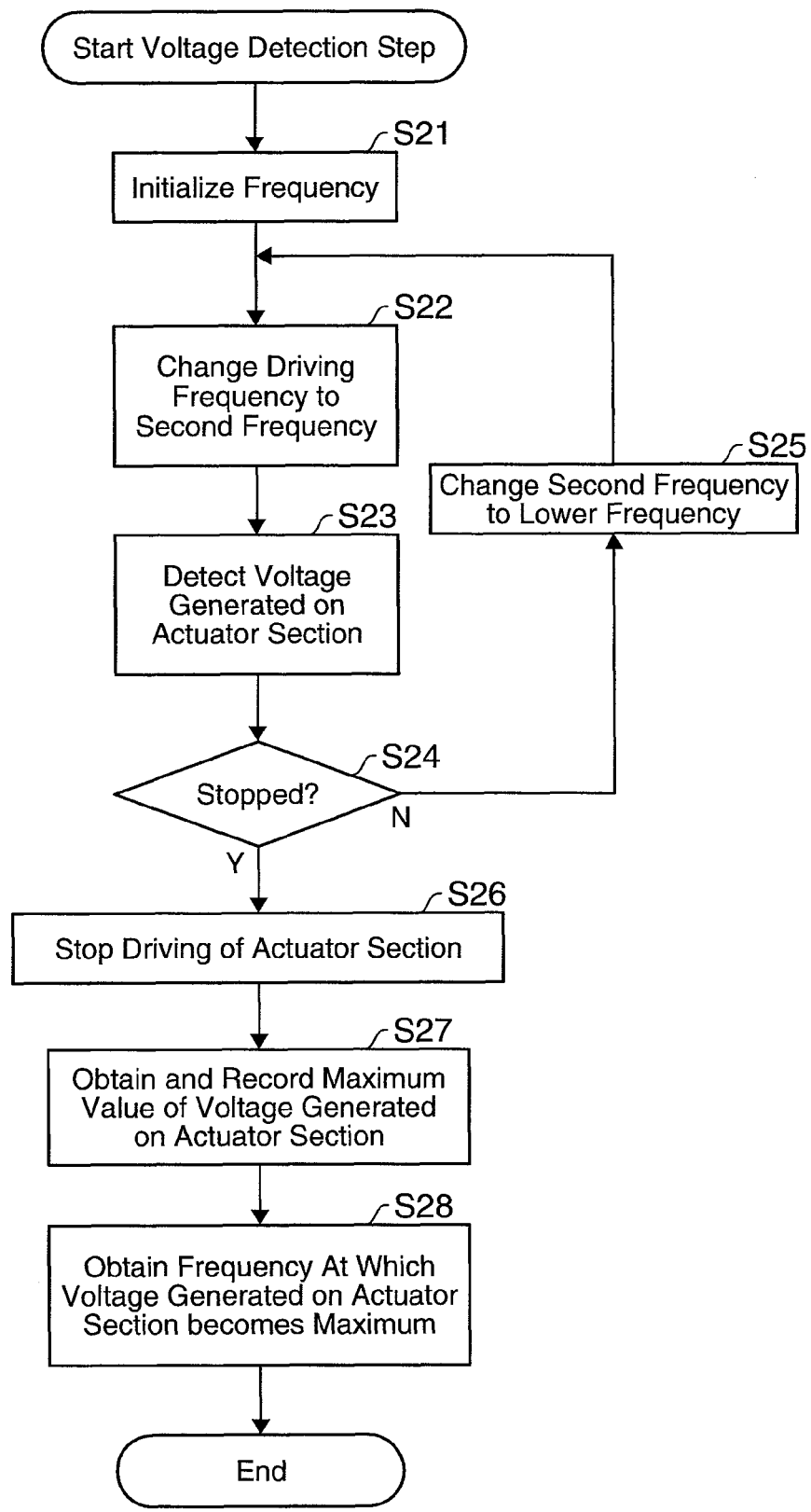
FIG. 10 is a flow chart of an example of the method for driving the ultrasonic motor in accordance with the embodiment of the invention.

Next, after the starting frequency detection step (S10) is performed, the voltage detection step (S20) of detecting voltages generated in the actuator section 200 is conducted while lowering the driving frequency in the state in which the ultrasonic motor 400 is running with the first frequency. As shown in FIG. 10, in this step, the starting frequency obtained in the starting frequency detection step (S10) is set as an initial value of the second frequency (step S21), and the driving frequency of the actuator is set at the second frequency (step S22). Next, while applying the AC voltage with the second frequency, voltages on the electrodes for detection 251 and 252 are checked (step S23), thereby judging as to whether the ultrasonic motor 400 is stopped (step S24). In this instance, if the ultrasonic motor 400 is not stopped (N in step S24), the second frequency is changed to a smaller value (step S25), and the driving frequency of the actuator is again set to a second frequency (step S22). It is noted that, in this step, if the driving frequency at which the ultrasonic motor 400 stops, the maximum value of detection voltage and the driving frequency at the maximum value are known in advance, the step of judging as to whether the ultrasonic motor stopped (step S24) and the step of setting the second frequency to a lower frequency (step S25) can be omitted.

Next, when the stoppage of the ultrasonic motor 400 is detected based on the voltages on the electrodes for detection 251 and 252 (Y in step S24), the driving of the actuator section 200 is stopped (step S26). Then, based on the measurement result of voltages generated on the electrodes for detection 251 and 252, the maximum voltage generated on the actuator section 200 is obtained and recorded (step S27). This step may be omitted if the control with the detected voltage is not performed in the driving step (S40) to be described below. Next, based on the measurement result of voltages generated on the electrodes for detection 251 and 252, a frequency at which the maximum voltage is generated on the actuator section 200 is obtained and recorded (step S28). This step may be omitted if the control with the frequency is not performed in the driving step (S40) to be described below. When the voltage detection step (S20) is finished, the ultrasonic motor 400 is placed in a stopped state. Referring to FIG. 7, the voltage detection step (S20) may be described as a step of obtaining the maximum voltage value and a frequency that causes the maximum voltage by measuring voltages generated on the electrodes for detection 251 and 252 while changing the frequency from Range 3 through Range 2 to a value in Range 1.

Figure 11:
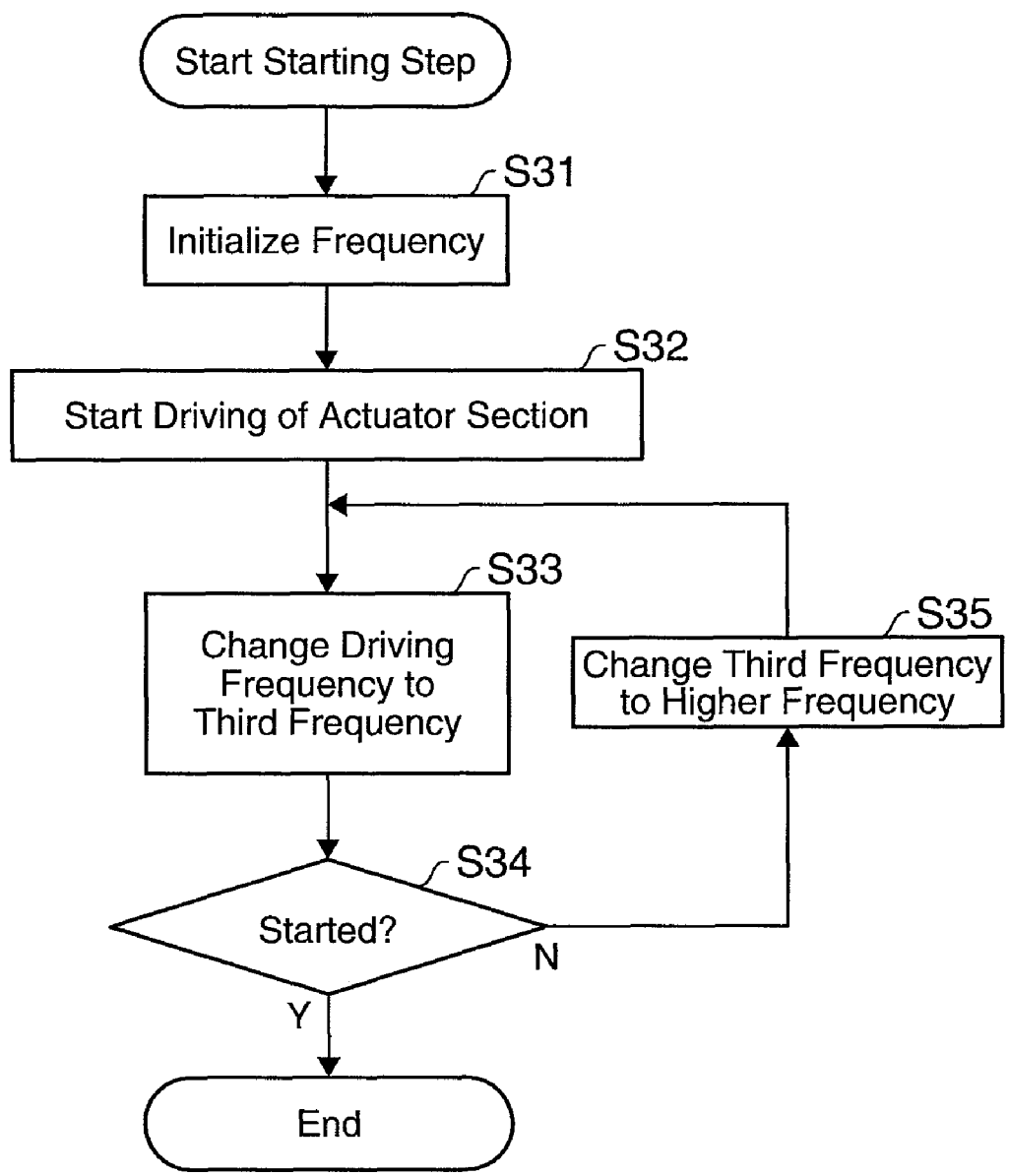
FIG. 11 is a flow chart of an example of the method for driving the ultrasonic motor in accordance with the embodiment of the invention.

Next, the operation step S2 is described. In the operation step S2, first, a starting step (S30) is conducted, as shown in FIG. 11. In this step, the driving frequency and an initial value of the third frequency are set at the starting frequency (first frequency) obtained in the starting frequency detecting step (S10) (step S31). Then, the driving of the actuator section 200 is started (step S32), and the driving frequency of the actuator section 200 is changed to a third frequency (step S33). Then, a determination is made by referring to voltages on the electrodes for detection 251 and 252 as to whether the ultrasonic motor 400 is started (step S34). In this instance, if the ultrasonic motor 400 is not started (N in step S34), the third frequency is changed to a higher value (step S35), and the driving frequency of the actuator section 200 is again set to a third frequency (step S33). If the ultrasonic motor 400 is started (Y in step S34), the step of starting the ultrasonic motor 400 (S30) is finished. Although the step of obtaining the non-startable range described above is included here, this step may be omitted. In other words, if the driving frequency with which the ultrasonic motor 400 can be started is known in advance, the step of judging as to whether the ultrasonic motor is started (step S34) and the step of setting the third frequency to a higher level (step S35) can be omitted. For example, a frequency with which the ultrasonic motor can be started may be confirmed by experiments conducted in advance, assuming the use condition, the confirmed frequency may be stored in a ROM or the like, and the stored frequency can be used as an initial value of the third frequency.

Figure 12:
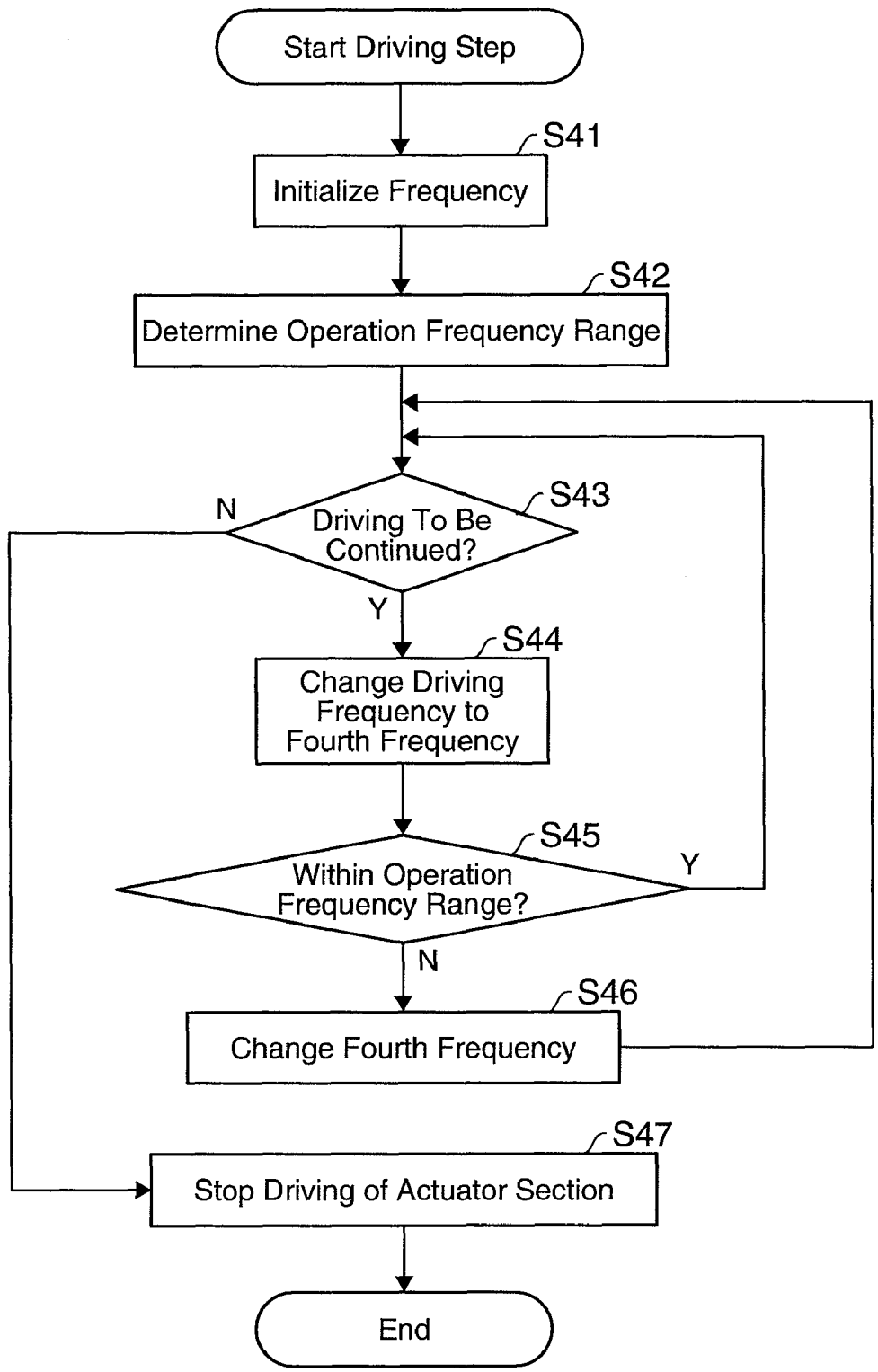
FIG. 12 is a flow chart of an example of the method for driving the ultrasonic motor in accordance with the embodiment of the invention.

The driving step S40 is consecutively conducted after the starting step S30. FIG. 12 shows an example of the driving step. The driving step involves a processing flow of actual driving operation of the ultrasonic motor. First, the driving frequency and the fourth frequency are initialized (step S41). As the driving step S40 is conducted immediately after the starting step S30, the final value of the third frequency in the starting step S30 may be set as is as an initial value of the driving frequency and the fourth frequency. Also, the driving of the actuator section has already started in the starting step S30.

Next, an operation frequency range is determined (step S42). The operation frequency range is a range lower than the third frequency described above and on a higher frequency side than the frequency at which the voltage generated on the actuator section 200 obtained in the voltage detection step (S20) becomes maximum. The operation frequency range is, as indicated in FIG. 7, a frequency range between the frequency $f_{peak}$ at which the voltage generated on the actuator section 200 becomes maximum which is obtained in the voltage detection step (S20) and the third frequency $f_3$. The fourth frequency described below is a lower frequency than the third frequency.

Here, a drive continuation instruction which is given by a control device (not shown) is checked (step S43). If the drive is to be continued (Y in step S43), the driving frequency of the actuator is set to a fourth frequency (step S44), and a determination is made as to whether the fourth frequency is within the operation frequency range (step S45). If the fourth frequency is not within the operation frequency range (N in step S45), the fourth frequency is changed (step S46), and the process goes back to the step of checking a drive continuation instruction (step S43). If the fourth frequency is within the operation frequency range (Y in step S45), the process goes back to the step of checking a drive continuation instruction (step S43). If there is an instruction to stop driving given from the unshown control device (N in step S43), the driving of the actuator is stopped (step S47), and the process is finished. In the step of changing the fourth frequency (step S46), the fourth frequency may be changed stepwise, and the interval of changes may preferably be 100 Hz to 1000 Hz.

According to the driving method described above, the ultrasonic motor 400 can be driven within the operation frequency range. When the ultrasonic motor 400 is driven in this range, the voltage generated on the actuator section 200 becomes higher than when it is driven at the starting frequency (third frequency) ($f_3$ in FIG. 7). In other words, according to the driving method described above, the ultrasonic motor 400 can be driven at higher rotational speeds than driven at the starting frequency. In addition, by driving the ultrasonic motor 400 within the operation frequency range, the driving frequency is restricted from becoming a frequency at which the ultrasonic motor 400 stops (in Range 1 in FIG. 7). In other words, according to the driving method described above, the ultrasonic motor 400 is prevented from abruptly stopping. Therefore, according to the driving method, the ultrasonic motor 400 can be efficiently and stably operated.

On the other hand, the operation frequency range described above may be set as follows. For example, the operation frequency range may be set, as indicated as a "second operation frequency range" in FIG. 7, in a range of frequencies at which the ultrasonic motor 400 cannot be started (i.e., non-startable frequency range), and in a higher frequency side than the frequency at which the voltage generated on the actuator section 200 which is obtained in the voltage detection step (S20) becomes maximum. The second operation frequency range is, as indicated in FIG. 7, between the frequency $f_{peak}$ at which the voltage generated on the actuator section 200 which is obtained in the voltage detection step (S20) becomes maximum and the frequency $f_{start}$ which is the upper limit of the non-startable frequency range. It is noted that the ultrasonic motor 400 can be started at the frequency $f_{start}$.

When the ultrasonic motor 400 is driven with the second operation frequency range being set in this manner, the voltage generated on the actuator section 200 becomes higher than when it is driven at a frequency in the startable frequency range (Range 3 in FIG. 7). In other words, according to the driving method described above, the ultrasonic motor 400 can be driven at higher rotational speeds than driven at frequencies in the startable range. In addition, by driving the ultrasonic motor 400 within the operation frequency range, the driving frequency is restricted from becoming a frequency at which the ultrasonic motor 400 stops (in Range 1 in FIG. 7). In other words, according to the driving method described above, the ultrasonic motor 400 is prevented from abruptly stopping. Therefore, according to the driving method, the ultrasonic motor 400 can be efficiently and stably operated.

Figure 13:
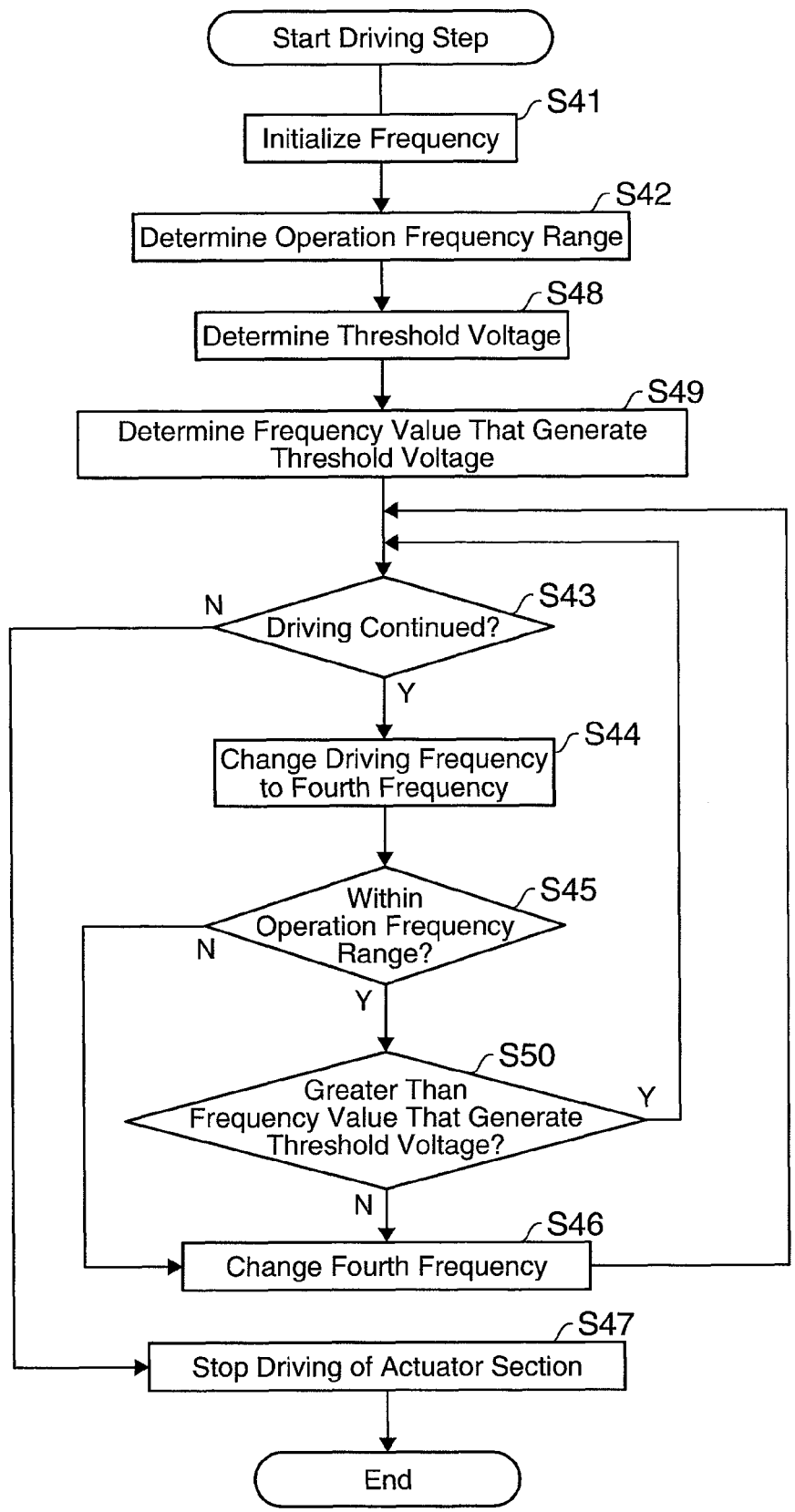
FIG. 13 is a flow chart of an example of the method for driving the ultrasonic motor in accordance with the embodiment of the invention.
Figure 14:
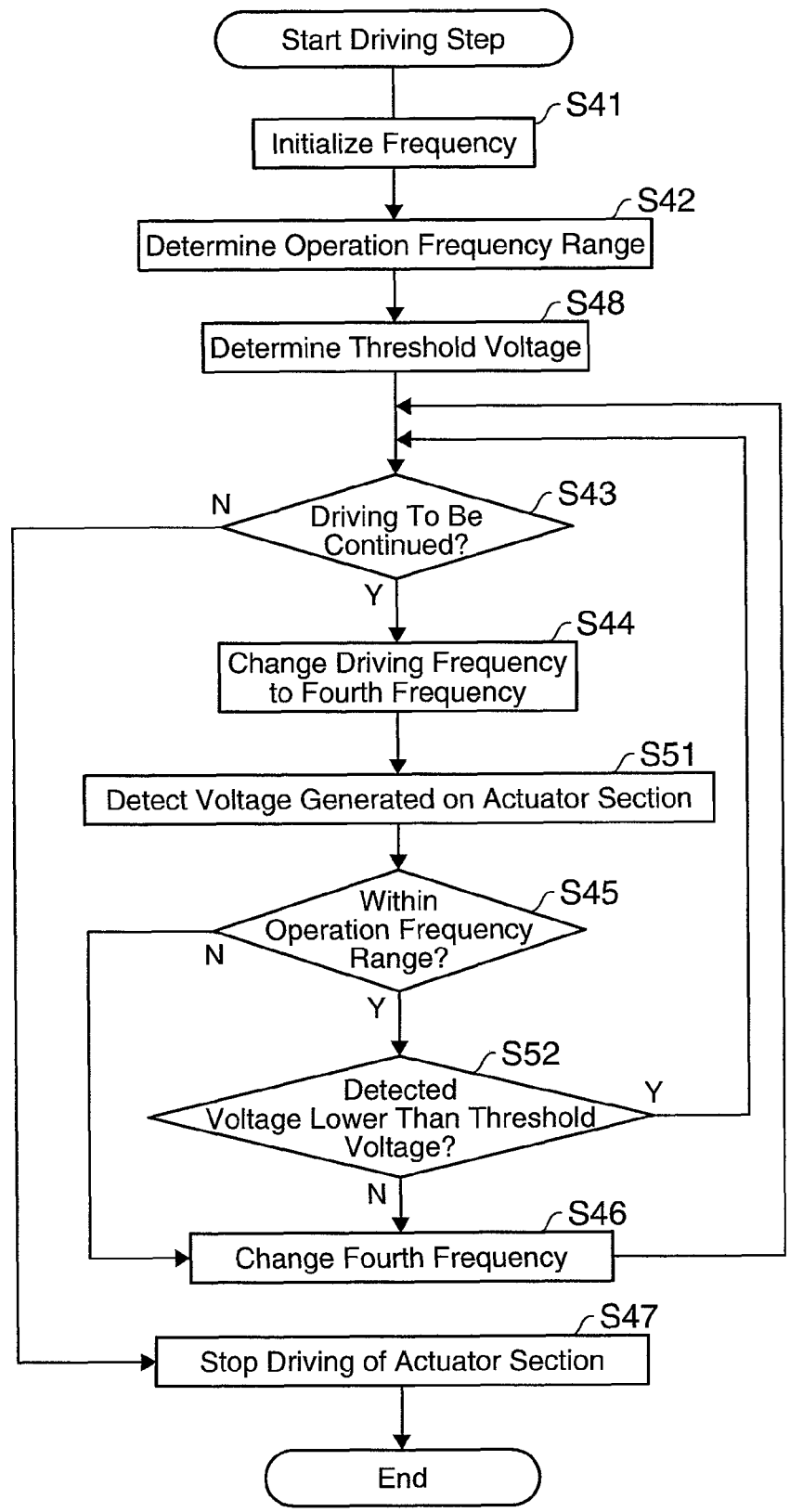
FIG. 14 is a flow chart of an example of the method for driving the ultrasonic motor in accordance with the embodiment of the invention.
Figure 15:
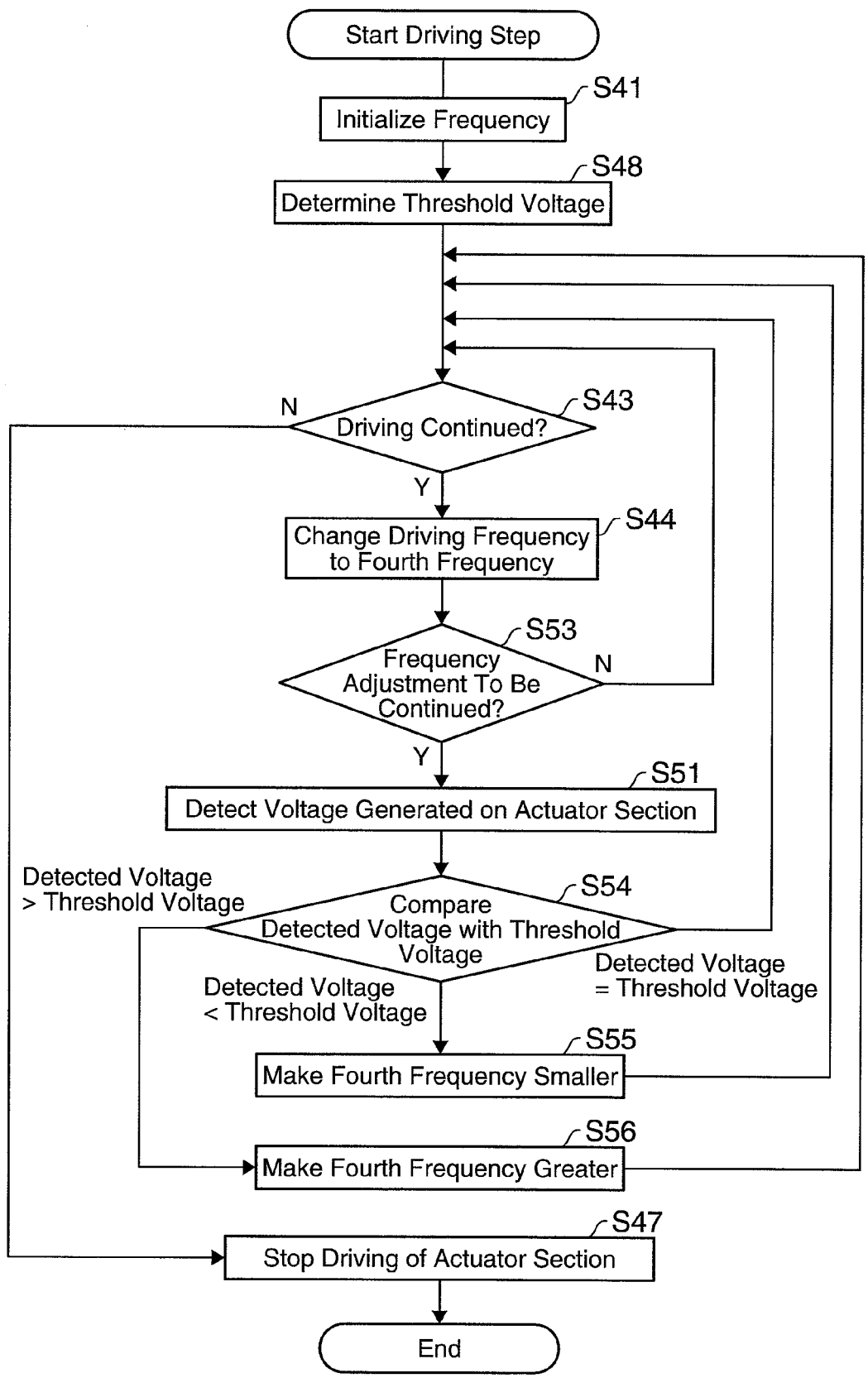
FIG. 15 is a flow chart of an example of the method for driving the ultrasonic motor in accordance with the embodiment of the invention.

The driving step (S40) may be modified in modes indicated in FIG. 13 through FIG. 15.

FIG. 13 is a flowchart of a modified example of the driving step (S40). In this example, the driving frequency and the fourth frequency are initialized with the final value of the third frequency in the starting step S30 (step S41), in a similar manner described above, and an operation frequency range is determined (step S42). Then, the maximum value of voltage detected on the actuator section 200 which is obtained in step S25 in the voltage detection step (S20) is multiplied by a coefficient less than one, thereby obtaining a threshold voltage value (step S48). The coefficient acts to more securely prevent the ultrasonic motor 400 from stopping. FIG. 7 shows a threshold voltage $V_{thr}$, and a threshold frequency $f_{thr}$ that is a frequency at which the threshold voltage $V_{thr}$ is detected in the voltage detection step (S20). The threshold frequency $f_{thr}$ may be selected on a higher frequency side than the frequency $f_{peak}$ at which the voltage generated on the actuator section 200 which is obtained in the voltage detection step (S20) becomes maximum.

If the driving frequency lowers below $f_{peak}$, the ultrasonic motor 400 would very much likely stop. However, by introducing the coefficient described above into the driving step (S40), some margin can be given in changing the driving frequency before the frequency becomes less than $f_{peak}$. The coefficient may be set according to the characteristics and use of the ultrasonic motor 400, and may be set at 0.5 to 0.95, for example.

In the modified example shown in FIG. 13, after the operation frequency range has been decided (step S42), the threshold voltage $V_{thr}$ is obtained (step S48), and a driving frequency value ($f_{thr}$) at which the threshold voltage $V_{thr}$ is detected in the voltage detection step (S20) is obtained (step S49). Here, a drive continuation instruction which is given by a control device (not shown) is checked (step S43). If the drive is to be continued (Y in step S43), the driving frequency of the actuator is set to a fourth frequency (step S44), and a determination is made as to whether the fourth frequency is within the operation frequency range (step S45). If the fourth frequency is not within the operation frequency range (N in step S45), the fourth frequency is changed (step S46), and the process goes back to the step of checking a drive continuation instruction (step S43). On the other hand, if the fourth frequency is within the operation frequency range (Y in step S45), a determination is made as to whether the fourth frequency is greater than the frequency value at which the threshold voltage is generated (step S50). If the fourth frequency is greater than the threshold frequency (Y in step S50), the process goes back to the step of checking a drive continuation instruction (step S43). When the fourth frequency is smaller than the threshold frequency (N in step S50), the fourth frequency is changed (step S46), and the process goes back to the step of checking a drive continuation instruction (step S43). If there is an instruction to stop driving given from the unshown control device (N in step S43), the driving of the actuator is stopped (step S47), and the process is finished.

FIG. 14 is a flowchart of another modified example of the driving step (S40). In this modified example, the driving frequency and the fourth frequency are initialized with the final value of the third frequency in the starting step S30 (step S41), in a manner similar to the above-described example, and an operation frequency range is determined (step S42). Then, the maximum value of voltage detected on the actuator section 200 which is obtained in step S25 in the voltage detection step (S20) is multiplied by a coefficient less than one, thereby obtaining a threshold voltage value (step S48). Here, a drive continuation instruction which is given by a control device (not shown) is checked (step S43). If the drive is to be continued (Y in step S43), the driving frequency of the actuator is set to a fourth frequency (step S44), and a detection voltage is obtained from the electrodes for detection 251 and 252 of the actuator section 200 (step S51). A determination is made as to whether the fourth frequency is within the operation frequency range (step S45). If the fourth frequency is within the operation frequency range (Y in step S45), a determination is made as to whether the detected voltage is less than the threshold voltage $V_{thr}$ (step S52). If the detected voltage is less than the threshold voltage (Y in step S52), the process returns to the step of checking a drive continuation instruction (step S43). If the fourth frequency is outside the operation frequency range (N in step S45), or the detected voltage is above the threshold voltage (Y in step S52), the fourth frequency is changed (step S46), and then the process returns to the step of checking a drive continuation instruction (step S43). If there is an instruction to stop driving given from the unshown control device (N in step S43), the driving of the actuator is stopped (step S47), and the process is finished.

According to the driving method of the modified example, the threshold voltage $V_{thr}$ is set lower by the coefficient than the maximum voltage $V_{peak}$ generated on the actuator section 200, some margin can be given in changing the driving frequency. Therefore, when the operation frequency range is set to the second operation frequency range, the voltage generated on the actuator section 200 becomes higher than when it is driven with frequencies in the startable range of the ultrasonic motor 400 (Range 3 in FIG. 7). In addition, even when the characteristic of the ultrasonic motor 400 is changed due to changes in the temperature of the ultrasonic motor 400 and the surrounding temperature, its stoppage would become more difficult to occur. Therefore, according to the driving method of the present modified example, the ultrasonic motor 400 can be efficiently and more stably operated.

FIG. 15 is a flowchart of yet another modified example of the driving step (S40). In this modified example, the driving frequency and the fourth frequency are initialized with the final value of the third frequency in the starting step S30 (step S41), in a manner similar to the above-described example, and then the maximum value of voltage detected on the actuator section 200 which is obtained in step S25 in the voltage detection step (S20) is multiplied by a coefficient less than one, thereby obtaining a threshold voltage value (step S48). Here, a drive continuation instruction which is given by a control device (not shown) is checked (step S43). If the drive is to be continued (Y in step S43), the driving frequency of the actuator is set to a fourth frequency (step S44), and then a frequency adjustment continuation instruction given by the unshown control device is checked (step S53). If the frequency adjustment is not to be continued (N in step S53), the process returns to the step of checking a drive continuation instruction (step S43). If the frequency adjustment is to be continued (Y in step S53), a detected voltage is obtained from the electrodes for detection 251 and 252 of the actuator section 200 (step S51). Then the detected voltage is compared with the threshold voltage $V_{thr}$ (step S54), and the fourth frequency is made greater (step S56) if the detected voltage is greater than the threshold voltage (the detected voltage>threshold voltage in step S54), or the fourth frequency is made smaller (step S55) if the detected voltage is smaller than the threshold voltage (the detected voltage<threshold voltage in step S54). If the detected voltage is equal to the threshold voltage (the detected voltage=threshold voltage in step S54), the process returns to the step of checking a drive continuation instruction (step S43) without changing the fourth frequency. Here, if there is an instruction to stop driving given from the unshown control device (N in step S43), the driving of the actuator is stopped (step S47), and the process is finished.

According to the process flow described above, the driving frequency approaches the threshold frequency $f_{thr}$ through the step of adjusting the driving frequency. For example, a target frequency value may be set in advance, and a determination as to whether the frequency adjustment is to be continued may be made based on whether the driving frequency has reached the target value. Also, the frequency adjustment may be set to be always continued. Also, a signal may be artificially given from outside to switch the continuation of frequency adjustment if necessary.

According to the driving method, the ultrasonic motor 400 is driven at frequencies near the threshold frequency $f_{thr}$, and would be difficult to stop. In other words, in accordance with the present modified example, the frequency can be continuously adjusted, such that, even when the threshold frequency $f_{thr}$ is changed due to external disturbances such as changes in the temperature, the driving frequency can be adjusted according to such change. In addition, because the threshold voltage $V_{thr}$ can be set lower by the coefficient than the maximum voltage $V_{peak}$ generated on the actuator section 200, some margin can be given in changing the driving frequency. Therefore, according to this driving method, the ultrasonic motor 400 can be driven at higher rotational speeds than being driven with frequencies in the startable range. Furthermore, even when the temperature of the ultrasonic motor 400 and the surrounding temperature change, such changes can be accommodated and the ultrasonic motor can be driven while it is made difficult to stop.

Some embodiments of the invention are described above in detail. However, those skilled in the art should readily understand that many modifications can be made without departing in substance from the novel matter and effects of the invention. Accordingly, those modified examples are also included in the scope of the invention.

What is claimed is:

1. A method for driving an ultrasonic motor having an actuator section comprising:
   a step of starting the ultrasonic motor by applying an AC voltage with a first frequency to the actuator section;
   a voltage detection step of detecting a voltage generated at the actuator section while lowering a driving frequency from the first frequency to a second frequency at which the ultrasonic motor stops;
   a starting step of starting the ultrasonic motor with a third frequency; and
   a driving step of changing the driving frequency from the third frequency to a lower frequency such that the driving frequency has a value within an operation frequency range,
   wherein the operation frequency range is within a range on a higher frequency side than the driving frequency at which a maximum voltage is detected in the voltage detection step.

2. A method for driving an ultrasonic motor according to claim 1, wherein the operation frequency range is within a non-startable range.

3. A method for driving an ultrasonic motor according to claim 1, wherein the driving step includes changing the driving frequency such that a voltage detected on the actuator section becomes lower than a threshold voltage that is obtained by multiplying the maximum voltage by a coefficient.

4. A method for driving an ultrasonic motor according to claim 3, wherein the driving step includes changing the driving frequency to a higher frequency side when the voltage detected on the actuator section is greater than the threshold voltage, and changing the driving frequency to a lower frequency side when the voltage detected on the actuator section is smaller than the threshold voltage.

5. A method for driving an ultrasonic motor according to claim 1, wherein the driving step includes changing the driving frequency such that a threshold voltage obtained by multiplying the maximum voltage detected on the actuator section by a coefficient becomes greater than the voltage detected in the voltage detection step.

6. A method for driving an ultrasonic motor according to claim 3, wherein the coefficient is between 0.5 and 0.95.

7. A method for driving an ultrasonic motor according to claim 1, wherein, in the driving step, the driving frequency is changed stepwise, and an interval of changes of the driving frequency is 100 Hz through 1000 Hz.

8. A method for driving an ultrasonic motor according to claim 1, further comprising a starting frequency detection step of increasing the driving frequency from a state in which the ultrasonic motor is stopped to a state in which the ultrasonic motor starts.

* * * * *